United States Patent
Zhamu et al.

(10) Patent No.: US 9,755,241 B2
(45) Date of Patent: *Sep. 5, 2017

(54) ALKALI METAL SECONDARY BATTERY CONTAINING A DENDRITE-INTERCEPTING LAYER

(71) Applicant: Nanotek Instruments, Inc., Dayton, OH (US)

(72) Inventors: Aruna Zhamu, Springboro, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 312 days.

This patent is subject to a terminal disclaimer.

(21) Appl. No.: 14/545,204

(22) Filed: Apr. 8, 2015

(65) Prior Publication Data
US 2016/0301078 A1  Oct. 13, 2016

(51) Int. Cl.
*H01M 4/13* (2010.01)
*H01M 4/62* (2006.01)
(Continued)

(52) U.S. Cl.
CPC ......... *H01M 4/628* (2013.01); *H01M 2/1646* (2013.01); *H01M 2/1673* (2013.01);
(Continued)

(58) Field of Classification Search
USPC .......................................................... 429/223
See application file for complete search history.

(56) References Cited

U.S. PATENT DOCUMENTS

| 7,759,008 B2 * | 7/2010 | Barker | C01B 25/455 429/209 |
|---|---|---|---|
| 8,962,188 B2 * | 2/2015 | Zhamu | H01M 4/134 429/223 |

(Continued)

OTHER PUBLICATIONS

A. Zhamu, et al., "Reviving Rechargeable Lithium Metal Batteries: Enabling Next-Generation High-Energy or High-Power Cells," Energy & Environment Science, 2012, 5, 5701-5707.

*Primary Examiner* — Nina Bhat

(57) ABSTRACT

A rechargeable alkali metal battery comprising: (A) an anode comprising an alkali metal layer and a dendrite penetration-resistant layer composed of multiple graphene sheets or platelets or exfoliated graphite flakes that are chemically bonded by a lithium- or sodium-containing species to form an integral layer that prevents dendrite penetration through the integral layer, wherein the lithium-containing species is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, x=0-1, y=1-4; (B) a cathode comprising a cathode layer; and (C) a separator and electrolyte component in contact with the anode and the cathode; wherein the dendrite penetration-resistant layer is disposed between the alkali metal layer and the separator.

20 Claims, 7 Drawing Sheets

(51) Int. Cl.
*H01M 4/134* (2010.01)
*H01M 12/08* (2006.01)
*H01M 10/0568* (2010.01)
*H01M 10/0569* (2010.01)
*H01M 10/0565* (2010.01)
*H01M 2/16* (2006.01)
*H01M 4/1395* (2010.01)
*H01M 4/36* (2006.01)
*H01M 4/38* (2006.01)
*H01M 4/58* (2010.01)
*H01M 4/587* (2010.01)
*H01M 10/052* (2010.01)
*H01M 10/054* (2010.01)
*H01M 4/02* (2006.01)

(52) U.S. Cl.
CPC ......... *H01M 4/134* (2013.01); *H01M 4/1395* (2013.01); *H01M 4/366* (2013.01); *H01M 4/382* (2013.01); *H01M 4/58* (2013.01); *H01M 4/587* (2013.01); *H01M 4/5815* (2013.01); *H01M 10/052* (2013.01); *H01M 10/054* (2013.01); *H01M 10/0565* (2013.01); *H01M 10/0568* (2013.01); *H01M 10/0569* (2013.01); *H01M 12/08* (2013.01); *H01M 2004/027* (2013.01); *H01M 2004/028* (2013.01); *H01M 2300/0025* (2013.01); *H01M 2300/0028* (2013.01); *Y02E 60/128* (2013.01)

(56) References Cited

U.S. PATENT DOCUMENTS

| | | | |
|---|---|---|---|
| 9,379,368 B2 * | 6/2016 | Roumi | H01M 2/166 |
| 9,564,656 B1 * | 2/2017 | Zhamu | H01M 10/054 |
| 2010/0062341 A1 * | 3/2010 | Hambitzer | H01M 2/14 |
| | | | 429/231.95 |

* cited by examiner (Top image: A layer of packed graphene sheets)

(Bottom image: graphene sheets bonded by Li chemical species)

ALKALI METAL SECONDARY BATTERY CONTAINING A DENDRITE-INTERCEPTING LAYER

FIELD OF THE INVENTION

The present invention provides a dendrite-intercepting layer for a rechargeable lithium metal battery (having lithium metal as the anode active material) or a sodium metal battery (having sodium metal as the anode active material and operating at a temperature no higher than 100° C.; such as the room temperature Na—S cell).

BACKGROUND

Rechargeable lithium-ion (Li-ion) and lithium metal batteries (e.g. Li-sulfur, Li metal-air, and lithium-metal oxide batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal. Hence, in general, Li metal batteries have a significantly higher energy density than lithium ion batteries.

Historically, rechargeable lithium metal batteries were produced using non-lithiated compounds, such as $TiS_2$, $MoS_2$, $MnO_2$, $CoO_2$, and $V_2O_5$, as the cathode active materials, coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's.

To overcome these safety issues, several alternative approaches were proposed in which either the electrolyte or the anode was modified. The first approach involves replacing Li metal by graphite (a Li insertion material) as the anode. The operation of such a battery involves shuttling Li ions between two Li insertion compounds at the anode and the cathode, respectively; hence, the name "Li-ion battery." Presumably because of the presence of Li in its ionic rather than metallic state, Li-ion batteries are inherently safer than Li-metal batteries. The second approach entails replacing the liquid electrolyte by a dry polymer electrolyte, leading to the Li solid polymer electrolyte (Li-SPE) batteries. However, Li-SPE has seen very limited applications since it typically requires an operating temperature of up to 80° C. The third approach involves the use of a solid electrolyte that is presumably resistant to dendrite penetration, but the solid electrolyte normally exhibits excessively low lithium-ion conductivity at room temperature. Alternative to this solid electrolyte approach is the use of a rigid solid protective layer between the anode active material layer and the separator layer to stop dendrite penetration, but this typically ceramic material-based layer also has a low ion conductivity and is difficult and expensive to make and to implement in a lithium metal battery. Furthermore, the implementation of such a rigid and brittle layer is incompatible with the current lithium battery manufacturing process and equipment.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of graphite anode is <372 mAh/g and that of lithium transition-metal oxide or phosphate based cathode active material is typically in the range of 140-200 mAh/g. As a result, the specific energy of commercially available Li-ion cells is typically in the range of 120-220 Wh/kg, most typically 150-180 Wh/kg. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. Among various advanced energy storage devices, alkali metal batteries, including Li-air (or Li—$O_2$), Na-air (or Na—$O_2$), Li—S, and Na—S batteries, are especially attractive due to their high specific energies.

The Li—$O_2$ battery is possibly the highest energy density electrochemical cell that can be configured today. The Li—$O_2$ cell has a theoretic energy density of 5.2 kWh/kg when oxygen mass is accounted for. A well configured Li—$O_2$ battery can achieve an energy density of 3 kWh/kg, 15-20 times greater than those of Li-ion batteries. However, current Li—$O_2$ batteries still suffer from poor energy efficiency, poor cycle efficiency, and dendrite formation and penetration issues.

One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8 + 16Li \leftrightarrow 8Li_2S$ that lies near 2.2 V with respect to $Li^+/Li°$. This electrochemical potential is approximately ⅔ of that exhibited by conventional positive electrodes (e.g. $LiMnO_4$). However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Assuming complete reaction to $Li_2S$, energy densities values can approach 2,500 Wh/kg and 2,800 Wh/l, respectively, based on the combined Li and S weights or volumes. If based on the total cell weight or volume, the energy densities can reach approximately 1,000 Wh/kg and 1,100 Wh/l, respectively. However, the current Li-sulfur cells reported by industry leaders in sulfur cathode technology have a maximum cell specific energy of 250-350 Wh/kg (based on the total cell weight), which is far below what is possible. In summary, despite its great potential, the practical realization of the Li—S battery has been hindered by several obstacles, such as low active material utilization efficiency, high internal resistance, self-discharge, and rapid capacity fading on cycling. These technical barriers are due to the poor electrical conductivity of elemental sulfur, the high solubility of lithium polysulfides in organic electrolyte (which migrate to the anode side, resulting in the formation of inactivated $Li_2S$ in the anode), and Li dendrite formation and penetration. The most serious problem remains to be the dendrite formation and penetration issues.

The traditional Na—S battery holds notable advantages, including high energy density (theoretical value: 760 Wh/kg) and efficiency (approaching 100%), low material cost (rich abundances of Na and S in nature), and long life. All these benefits make them promising for stationary storage applications, for example, utility-based load-leveling and peak-shaving in smart grid, and emergency/uninterruptible power supply. However, this traditional Na—S must operates at a temperature higher than 300° C. The ceramic electrolyte is very brittle and, once a crack is initiated, the system can undergo a catastrophic failure, causing explosion. Thus, a Na—S cell that operates at room temperature is highly desirable.

Sodium metal (Na) has similar chemical characteristics to Li and the sulfur cathode in room temperature sodium-sulfur cells (RT Na—S batteries) faces the same issues observed in Li—S batteries, such as: (i) low active material utilization rate, (ii) poor cycle life, and (iii) low Coulumbic efficiency. Again, these drawbacks arise mainly from insulating nature of S, dissolution of polysulfide intermediates in liquid electrolytes (and related Shuttle effect), large volume change during charge/discharge, and dendrite penetration. Despite great efforts worldwide, dendrite formation and penetration remains the single most critical scientific and technological barrier against widespread implementation of all kinds of high energy density batteries having a Li metal anode.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials. Lithium metal would be an ideal anode material in a lithium-sulfur secondary battery if dendrite related issues could be addressed.

We have discovered a dendrite-resistant, nano graphene-enabled Li metal cell configuration [A. Zhamu, et al., "Reviving Rechargeable Lithium Metal Batteries: Enabling Next-Generation High-Energy or High-Power Cells," *Energy & Environment Science*, 2012, 5, 5701-5707]. Each cell consists of a graphene surface-supported Li metal anode and a cathode containing either graphene itself or a graphene-enhanced Li insertion compound (e.g. vanadium oxide) as a cathode active material. Graphene is a single-atom thick layer of $sp^2$ carbon atoms arranged in a honeycomb-like lattice. Graphene can be readily prepared from graphite, activated carbon, graphite fibers, carbon black, and meso-phase carbon beads. Single-layer graphene and its slightly oxidized version (GO) can have a specific surface area (SSA) as high as 2670 $m^2/g$. It is this high surface area that dramatically reduces the effective electrode current density, which in turn significantly reduces the possibility of Li dendrite formation. More specifically, by implementing graphene sheets to increase the anode surface areas, one can significantly reduce the anode current density, thereby dramatically prolonging the dendrite initiation time and decreasing the growth rate of a dendrite, if ever initiated, possibly by a factor of up to $10^{10}$ and $10^5$, respectively. However, if a dendrite somehow is formed, this tree-like entity can quickly reach the separator and penetrate through it. This graphene nano-structure was not capable of stopping or intercepting the dendrite once formed.

Hence, an object of the present invention is to provide a dendrite resistant, rechargeable lithium metal battery or sodium metal battery that exhibits an exceptionally high specific energy or high energy density. One particular technical goal of the present invention is to provide a Li metal-sulfur or sodium-sulfur cell with a cell specific energy greater than 500 Wh/Kg, preferably greater than 600 Wh/Kg, and more preferably greater than 800 Wh/Kg (all based on the total cell weight). These must be accompanied by good resistance to dendrite formation, and a long and stable cycle life. Thus, another object of the present invention is to provide a simple, cost-effective, and easy-to-implement approach to preventing potential Li metal dendrite-induced internal short circuit and thermal runaway problems in Li metal-sulfur batteries.

SUMMARY OF THE INVENTION

The present invention provides a rechargeable alkali metal battery (lithium metal battery or sodium metal battery), comprising: (A) an anode comprising an alkali metal layer, an optional anode current collector layer, and a dendrite penetration-resistant layer composed of multiple graphene sheets or platelets or exfoliated graphite flakes that are chemically bonded by a lithium- or sodium-containing species to form an integral layer that prevents dendrite penetration through the integral layer; (B) a cathode comprising a cathode layer having a cathode active material for reversibly storing alkali metal ions and an optional cathode current collector layer to support the cathode active material; and (C) a separator and electrolyte component in contact with the anode and the cathode; wherein the dendrite penetration-resistant layer is disposed between the alkali metal layer and the separator. Since any dendrite, if present, would be stopped or intercepted by this dendrite penetration-resistant layer, the dendrite could not reach and penetrate the separator layer to cause internal shorting.

In a preferred embodiment, the lithium- or sodium-containing species is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group (e.g. R=CH—, $CH_2$—, $CH_3CH_2$—, etc.), x=0-1, y=1-4. These species are capable of bonding multiple sheets/platelets of a graphene material or multiple flakes of exfoliated graphite together to form a structurally sound layer that is sufficiently strong to intercept or stop dendrite penetration. Yet, such a layer is permeable to lithium ions or sodium ions. Preferably and typically, this layer is electronically insulating, but ionically conducting.

The graphene sheets or platelets include single-layer sheets or multi-layer platelets of a graphene material selected from pristine graphene, graphene oxide having 2% to 46% by weight of oxygen, reduced graphene oxide having 0.01% to 2% by weight of oxygen, chemically functionalized graphene, nitrogen-doped graphene, boron-doped graphene, fluorinated graphene, or a combination thereof and these graphene sheets or platelets are preferably interconnected (overlapped with one another). The graphene sheets or platelets preferably have a thickness less than 10 nm. Preferably, the graphene sheets or platelets contain single-layer or few-layer graphene, wherein few-layer is defined as 10 planes of hexagonal carbon atoms or less. In an embodiment, graphene sheets contain point defects to promote migration of lithium or sodium ions, wherein the point defects are produced by removing non-carbon elements or chemical functional groups from graphene surfaces.

In the dendrite penetration resistant layer, the graphene sheets or platelets or exfoliated graphite flakes are bonded by the lithium- or sodium-containing species in an edge-to-edge, edge-to-face, or face-to-face manner. In a preferred embodiment, the graphene sheets or platelets or exfoliated graphite flakes have a length or width smaller than 1 μm, preferably smaller than 0.5 µm, more preferably smaller than 200 nm, and most preferably smaller than 100 nm. These desired dimensions are measured prior to these sheets/platelets/flakes being bonded by the lithium- or sodium-containing species. These desired dimensions appear to provide a good combination of dendrite penetration resistance and high ion permeability.

There is no restriction on the thickness of the dendrite-intercepting layer, but for practical purposes, the dendrite penetration-resistant layer preferably has a thickness from 2 nm to 20 µm, more preferably from 10 nm to 10 µm, and most preferably from 100 nm to 5 µm.

The cathode active material in this rechargeable alkali metal battery may be selected from sulfur, selenium, tellurium, lithium sulfide, lithium selenide, lithium telluride, sodium sulfide, sodium selenide, sodium telluride, a chemically treated carbon or graphite material having an expanded inter-graphene spacing $d_{002}$ of at least 0.4 nm, or an oxide, dichalcogenide, trichalcogenide, sulfide, selenide, or telluride of a transition metal, such as niobium, zirconium, molybdenum, hafnium, tantalum, tungsten, titanium, vanadium, chromium, cobalt, manganese, iron, nickel, or a combination thereof.

In an embodiment, the cathode layer contains an air cathode and the battery is a lithium-air battery or sodium-air battery. In another embodiment, the cathode active material is selected from sulfur or lithium polysulfide and the battery is a lithium-sulfur or sodium-sulfur battery.

The electrolyte in this battery may comprise a metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, sodium perchlorate ($NaClO_4$), sodium hexafluorophosphate ($NaPF_6$), sodium borofluoride ($NaBF_4$), sodium hexafluoroarsenide, sodium trifluoro-metasulfonate ($NaCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide sodium ($NaN(CF_3SO_2)_2$), or a combination thereof.

The electrolyte may contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolyte may be selected from polymer electrolyte, polymer gel electrolyte, composite electrolyte, ionic liquid electrolyte, aqueous electrolyte, non-aqueous liquid electrolyte, soft matter phase electrolyte, solid-state electrolyte, or a combination thereof.

In one preferred embodiment, the dendrite penetration-resistant layer is a lithium ion conductor or sodium ion conductor having an ion conductivity no less than $10^{-4}$ S/cm, more preferably no less than $10^{-3}$ S/cm.

The alkali metal layer in the anode may contain an anode active material selected from lithium metal, sodium metal, a lithium metal alloy, sodium metal alloy, a lithium intercalation compound, a sodium intercalation compound, a lithiated compound, a sodiated compound, or a combination thereof. The Li or Na content in this alkali metal layer preferably is at least 70% by weight, more preferably >80%, and most preferably >90%.

The advantages and features of the present invention will become more transparent with the description of the following best mode practice and illustrative examples.

BRIEF DESCRIPTION OF THE DRAWINGS

FIG. 1 (B) Another schematic drawing to illustrate the process for producing exfoliated graphite, expanded graphite flakes, and graphene sheets.

DETAILED DESCRIPTION OF PREFERRED EMBODIMENTS

Figure 1A:
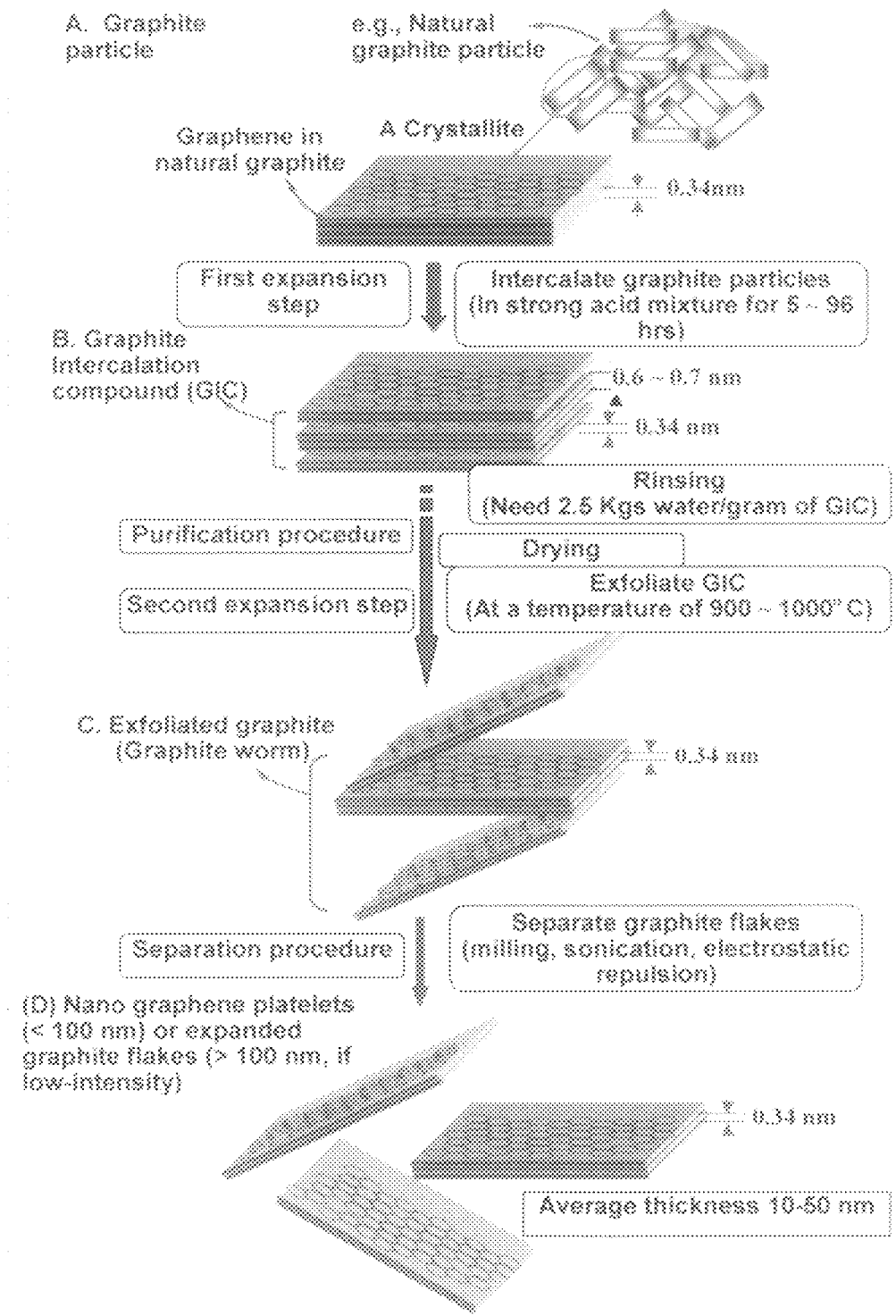
FIG. 1 (A) Schematic of the commonly used procedures for producing exfoliated graphite worms and graphene sheets.
Figure 1:
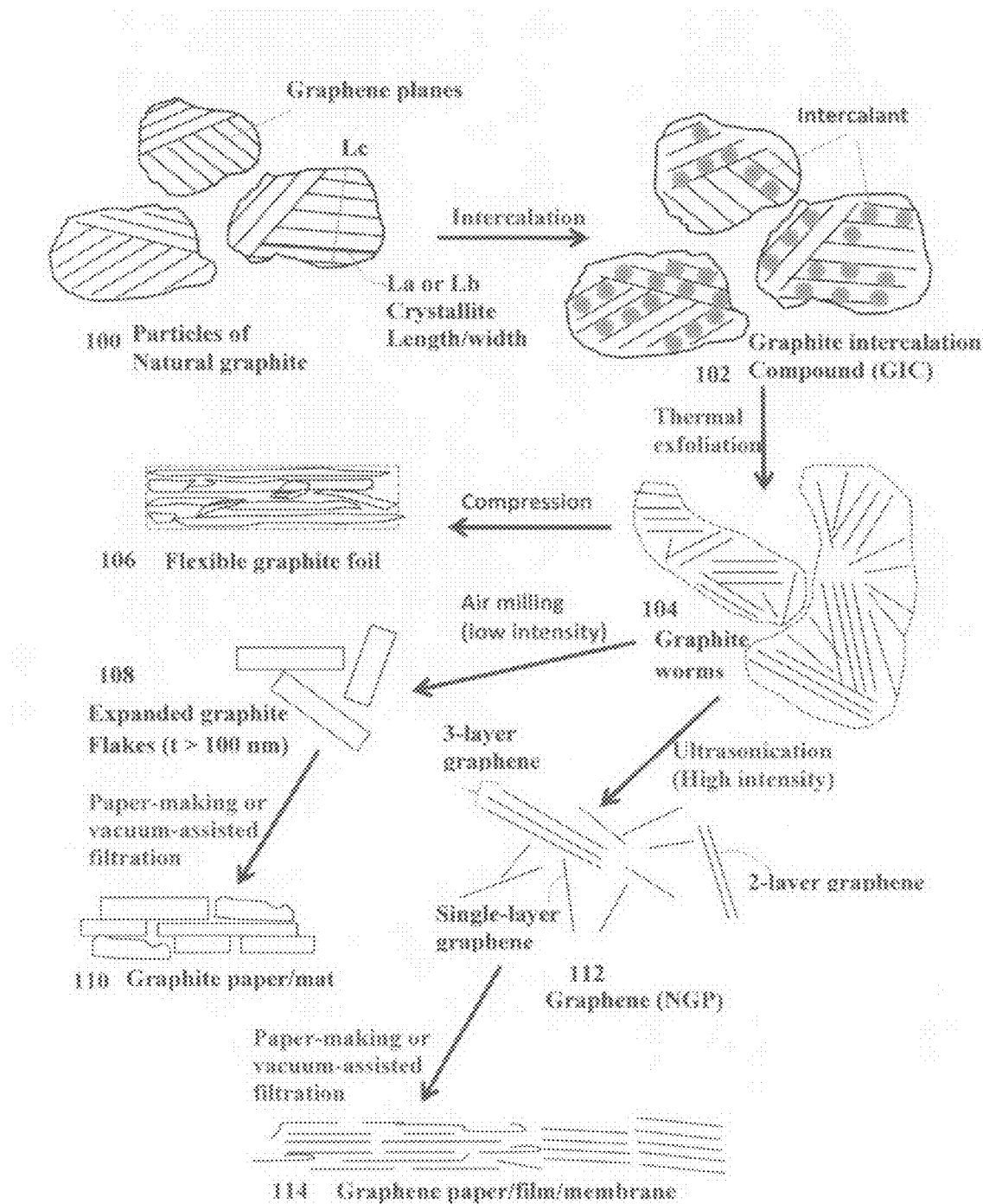

For illustration purpose, the following discussion of preferred embodiments is primarily based on Li—S cells (as an example), but the same or similar principles and procedures are applicable to all other rechargeable lithium metal batteries (using lithium metal or metal alloy as the anode active material) and all rechargeable sodium metal batteries (using sodium metal or metal alloy as the anode active material). The cathode active materials can be, for instance, a transition metal oxide ($V_2O_5$) or sulfide (e.g. $MoS_2$), sulfur or polysulfide (lithium polysulfide or sodium polysulfide), or just outside air (for a lithium-air or sodium-air battery).

The present invention provides a dendrite penetration resistant layer to be implemented between an anode active material layer (e.g. a Li foil or Na foil) and a porous separator. In a preferred embodiment, such a dendrite-intercepting or dendrite-stopping layer is made from an integral layer of porous graphene structure composed of a plurality of graphene sheets/platelets or exfoliated graphite flakes that are packed together. There are typically gaps or voids between sheets/platelets/flakes. These gaps or voids are impregnated by active lithium- and/or sodium-containing species that chemically bond to the edges and/or faces of these graphene sheets, essentially sealing off most or all of these gaps. Due to the high strength of individual graphene sheets and the resulting integral layer, a dendrite, if existing and growing, cannot penetrate through this integral layer. However, the graphene sheets (particularly those containing a god amount of point defects) and the lithium- or sodium-containing species are such that they are permeable to lithium ions or sodium ions.

These bonding species can be simply the products or by-products of chemical reactions between the electrolyte (Li or Na salt and solvent) and the graphene surfaces or edges (where elements such as C, O, H, and N are often present) that are induced by externally applied current/voltage in an electrochemical reactor. This will be discussed in more detail later.

In a preferred embodiment, the lithium- or sodium-containing species may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_x SO_y$, or a combination thereof, wherein X=F, Cl, I, or Br, R=a hydrocarbon group (e.g. R=CH—, $CH_2$—, $CH_3CH_2$—, etc.), x=0-1, y=1-4. These species are surprisingly capable of bonding multiple sheets/platelets of a graphene material or multiple flakes of exfoliated graphite together to form a structurally sound layer that is sufficiently strong to intercept or stop dendrite penetration. Such a layer is also permeable to lithium ions or sodium ions. Preferably, this layer is electronically insulating, but ionically conducting. Typically not just one, but at least two types of lithium- or sodium-containing species in the above list are present in the dendrite penetration-resistant layer.

The graphene sheets or platelets include single-layer sheets or multi-layer platelets of a graphene material selected from pristine graphene, graphene oxide having 2% to 46% by weight of oxygen, reduced graphene oxide having 0.01% to 2% by weight of oxygen, chemically functionalized graphene, nitrogen-doped graphene, boron-doped graphene, fluorinated graphene, or a combination thereof and these graphene sheets or platelets are preferably interconnected (overlapped with one another). The graphene sheets or platelets preferably have a thickness less than 10 nm, more preferably less than 2 nm. Preferably, the graphene sheets or platelets contain single-layer or few-layer graphene, wherein few-layer is defined as 10 planes of hexagonal carbon atoms or less. Preferably, the graphene planes have a controlled amount of point defects (e.g. missing C atoms, incomplete carbon hexagon structures, etc.), which are fast paths for migration of lithium or sodium ions. These point defects are typically residues of what used to be chemical functional groups (e.g. —C=O, —OH, —COOH, —$NH_2$, —O—, —F, —Cl, —Br, —I, etc.) originally attached to graphene planes.

The graphene sheets or platelets or exfoliated graphite flakes preferably have a length or width smaller than 1 μm, preferably smaller than 0.5 more preferably smaller than 200 nm, and most preferably smaller than 100 nm. These desired dimensions are measured before these sheets/platelets/flakes are bonded by the lithium- or sodium-containing species. We have unexpectedly discovered that smaller graphene sheets normally lead to higher ion conductivity values, beneficial to rate capabilities of the battery.

In the dendrite penetration resistant layer, the graphene sheets or platelets or exfoliated graphite flakes are bonded by the lithium- or sodium-containing species in an edge-to-edge, edge-to-face, or face-to-face manner. It is surprising to discover that multiple graphene sheets can be packed together to form a layer of structural integrity with these lithium- or sodium-containing species, and without the use of a binder resin. This is unexpected since these lithium- or sodium-containing species have not been known to have any adhesion or binding power, and such a layer can hold its shape and functions during repeated charges and discharges of the resulting battery cell.

A. Methods or Processes for Producing Lithium- or Sodium-Containing Species

The preparation of dendrite-stopping layers may be conducted in an electrochemical reactor, which is an apparatus very similar to an electrode plating system. In this reactor, a graphene or exfoliated graphite flake-based porous structure (in the form of a mat, paper, film, etc.) is used as a working electrode and lithium sheet (or sodium sheet) as a counter electrode. Contained in the reactor is an electrolyte composed of a lithium or sodium salt dissolved in a solvent (e.g. 1M $LiPF_6$ dissolved in a mixture of ethylene carbonate (EC) and dimethyl carbonate (DMC) at a 1:1 ratio by volume). A current is then imposed between these two electrodes (lithium or sodium sheet electrode and the graphene mat working electrode). The graphene sheets or exfoliated graphite flakes in the working electrode are galvanostatically discharged (e.g. Li ions being sent to and captured by graphene surfaces/edges) and charged (Li ions released by graphene) in the voltage range from 0.01V to 4.9V at the current densities of 100-1000 mA/g following a voltage-current program similar to what would be used in a lithium-ion battery. However, the system is intentionally subjected to conditions conducive to oxidative degradation of electrolyte (e.g. close to 0.01-1.0 V vs. $Li/Li^+$) or reductive degradation of electrolyte (4.1-4.9 V vs. $Li/Li^+$) for a sufficient length of time. The degradation products react with $Li^+$ ions, Li salt, functional groups (if any) or carbon atoms on graphene edges/planes to form the lithium-containing species that also chemically bond, bridge, or cross-link the otherwise separate graphene sheets together.

The chemical compositions of the lithium-containing species are governed by the voltage range, the number of cycles (from 0.01 V to 4.9 V, and back), solvent type, lithium salt type, chemical composition of graphene sheets (e.g. % of 0, H, and N), and electrolyte additives (e.g. $LiNO_3$, if available). The morphology, structure and composition of graphene oxide (GO), reduced graphene oxide (RGO), the lithium-containing species that are bonded to graphene sheets can be characterized by scanning electron microscope (SEM), transmission electron microscope (TEM), Raman spectrum, X-ray diffraction (XRD), Fourier Transform Infrared Spectroscopy (FTIR), elemental analysis, and X-ray photoelectron spectroscopy (XPS).

Figure 4:
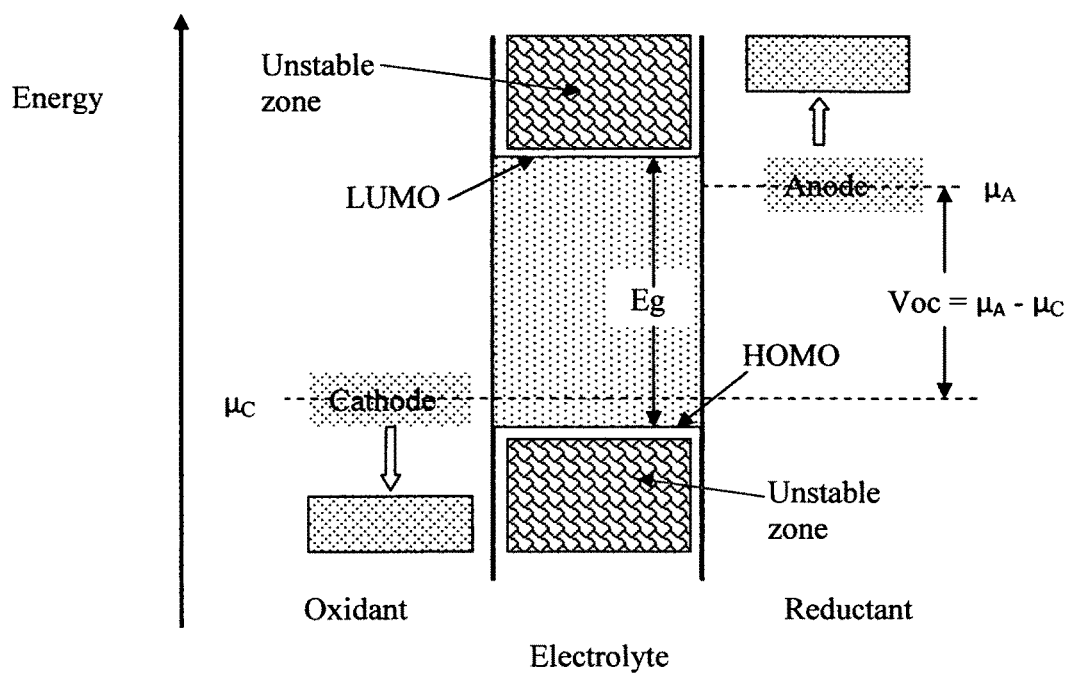
FIG. 4 An energy diagram to illustrate electrochemical potential or energetic conditions under which electrolyte in an electrochemical reactor undergoes oxidative or reductive degradation at the electrode-electrolyte boundary.
Figure 5:
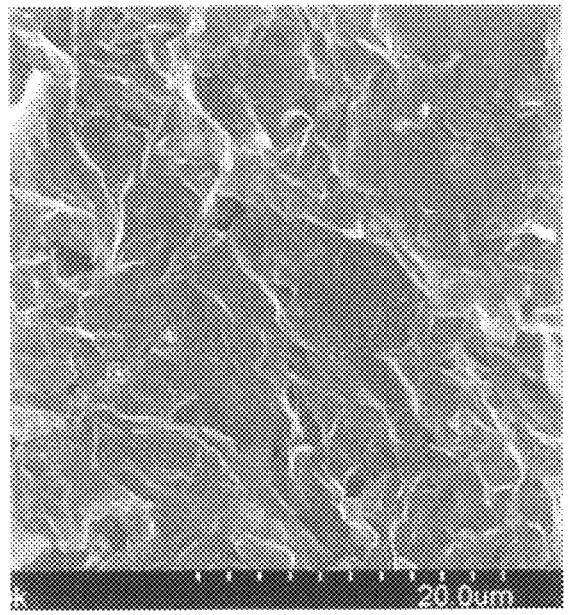
FIG. 5 The upper SEM image is for a layer of graphene sheets stacked together to form a porous structure (prior to being bonded to lithium-containing species); the lower SEM image for a layer of graphene sheets bonded by lithium-containing species.
Figure 5:
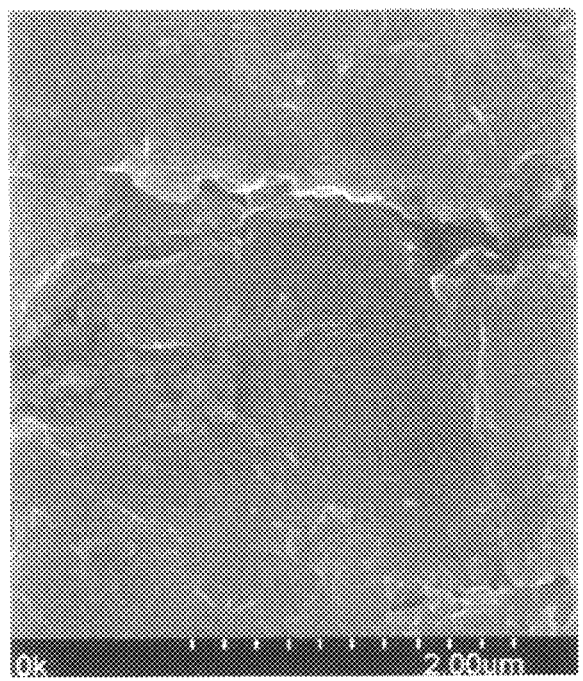
Figure 6:
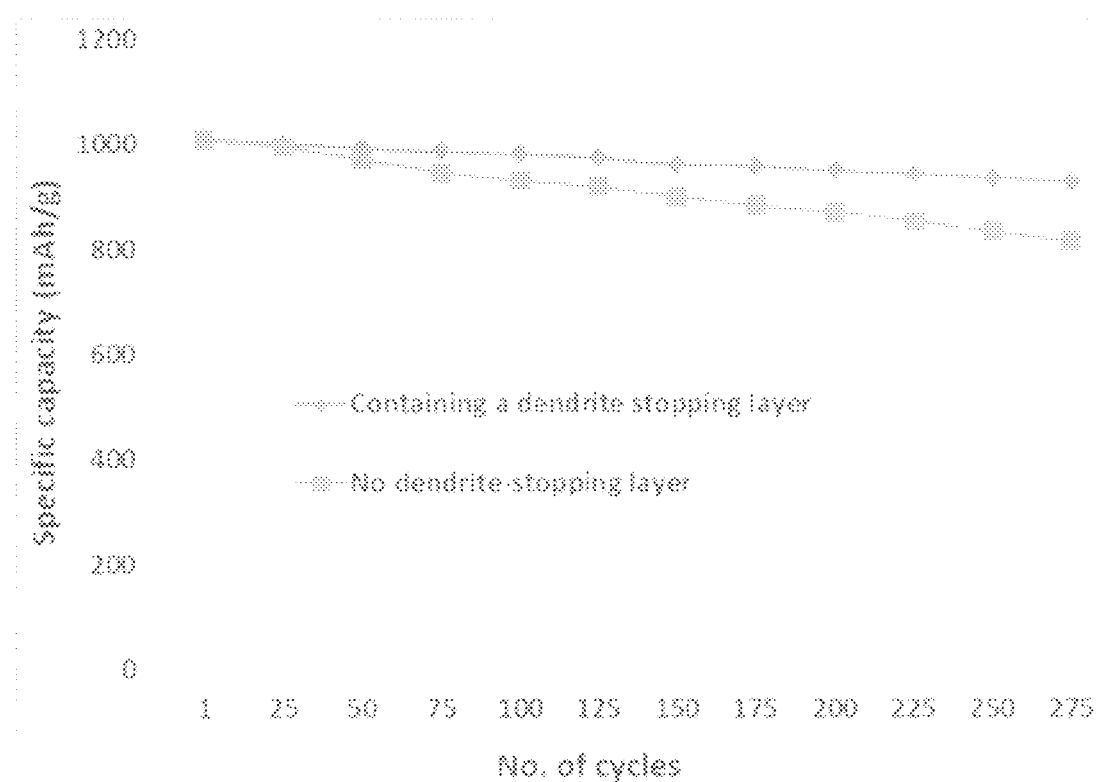
FIG. 6 The specific discharge capacities of two Li—S cells, one containing the presently invented dendrite-intercepting layer and the other not containing such a layer, are plotted as a function of the number of charge/discharge cycles.

The decomposition of non-aqueous electrolyte leads to the formation of lithium or sodium chemical compounds that bond to graphene surfaces and edges. The reasons why the non-aqueous electrolyte decomposed during discharge-charge cycling in an electrochemical reactor may be explained as follows. As illustrated in FIG. 4, in an electrochemical reactor system where there are a cathode and an anode in contact with an electrolyte, the thermodynamic stability of the electrolyte is dictated by the relative electron energies of the two electrodes relative to the energy level of the non-aqueous electrolyte. The anode is potentially a reductant, and the cathode an oxidant. The two electrodes are typically electronic conductors and, in this diagram, their electrochemical potential are designated as $\mu_A$ and $\mu_C$ (or Fermi energies $\epsilon_F$), respectively. The energy separation, $E_g$, between the lowest unoccupied molecular orbital (LUMO) and the highest occupied molecular orbital (HOMO) of the electrolyte is the stable electrochemical window of the electrolyte. In other words, in order for the electrolyte to remain thermodynamically stable (i.e. not to decompose), the electrochemical potential of the anode ($\mu_A$) must be maintained below the LUMO and $\mu_C$ of the cathode must be above the HOMO.

From the schematic diagram of FIG. 4, we can see that an anode with $\mu_A$ above the LUMO and a cathode with $\mu_C$ below the HOMO will reduce and oxidize the electrolyte, respectively, unless a passivating film is formed that creates a barrier to electron transfer between the anode and electrolyte or between the cathode and the electrolyte. In the presently invented method, an external current/voltage is intentionally applied over the anode and the cathode to bias their respective electrochemical potential levels so that the electrolyte can go outside of the stable electrochemical potential window, undergoing oxidative and/or reductive degradation. The degradation products are reactive species that react among themselves and with the functional groups or active atoms of graphene sheets, forming a mass of lithium- or sodium-containing species that bond graphene sheets together.

For the list of lithium/sodium salts and solvents investigated, the electrolytes have an oxidation potential (HOMO) at about 4.7 V and a reduction potential (LUMO) near 1.0 V. (All voltages in this specification are with respect to Li$^+$/Li or Na$^+$/Na). We have observed that the chemical interaction of Li$^+$ or Na$^+$ ions with graphene planes or edges occur at about 0.01-0.8 V, so electrolytes are prone to reductive degradation in the voltage range of 0.01-0.8 V. By imposing a voltage close to 4.7 volts, the electrolytes are also subject to oxidative degradation. The degradation products spontaneously react with chemical species associated with graphene planes or edges, forming a material phase that bonds together graphene sheets during the charge-discharge cycling (electrolyte reduction-oxidation cycling). In general, these lithium- or sodium-containing species are not electrically conducting and, hence, these reactions can self-terminate to form essentially a passivating phase.

The electrolytes that can be used in this electrochemical decomposition reactor may be selected from any lithium or sodium metal salt that is dissolvable in a solvent to produce an electrolyte. Preferably, the metal salt is selected from lithium perchlorate (LiClO$_4$), lithium hexafluorophosphate (LiPF$_6$), lithium borofluoride (LiBF$_4$), lithium hexafluoro-arsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), lithium nitrate (LiNO$_3$), Li-Fluoroalkyl-Phosphates (LiPF$_3$(CF$_2$CF$_3$)$_3$), lithium bisperfluoroethysulfonylimide (LiBETI), lithium bis(trifluoromethanesulphonyl)imide, lithium bis(fluorosulphonyl)imide, lithium trifluoromethanesulfonimide (LiTFSI), sodium perchlorate (NaClO$_4$), sodium hexafluorophosphate (NaPF$_6$), sodium borofluoride (NaBF$_4$), sodium trifluoro-metasulfonate (NaCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide sodium (NaN(CF$_3$SO$_2$)$_2$), or a combination thereof. It may be noted that these metal salts are also commonly used in the electrolytes of rechargeable lithium or sodium batteries.

The electrolytes used in this electrochemical reactor may contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof. These solvents are also commonly used in the electrolytes of rechargeable lithium or sodium batteries.

B. Production of Various Graphene and Exfoliated Graphite Materials

In a preferred embodiment, the graphene sheets in a dendrite-intercepting layer is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. Alternatively, the backbone of a dendrite-intercepting layer may be selected from flakes of an exfoliated graphite material. The starting graphitic material for producing any one of the above graphene or exfoliated graphite materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

In one process, graphene materials are obtained by intercalating natural graphite particles with a strong acid and/or an oxidizing agent to obtain a graphite intercalation compound (GIC) or graphite oxide (GO), as illustrated in FIG. 1(A) and FIG. 1(B) (schematic drawings). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 1(B)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (106) that typically have a thickness in the range of 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation bas been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides:

Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

It may be noted that graphene oxide, graphene fluoride, graphene bromide, nitrogenated graphene, doped graphene (e.g. B-doped graphene), etc. contain many functional groups that can become defects on graphene planes when these groups are removed. These functional groups, when removed, result in the formation of point defects, which could promote migration of lithium or sodium ions.

The aforementioned features are further described and explained in detail as follows: As illustrated in FIG. 1(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction). A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction.

Figure 2:
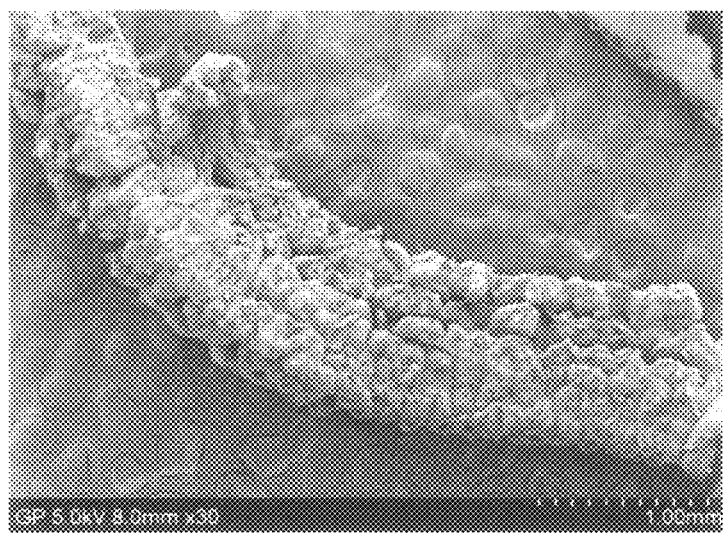
FIG. 2 SEM images of exfoliated graphite worms imaged at a low magnification.
Figure 3:
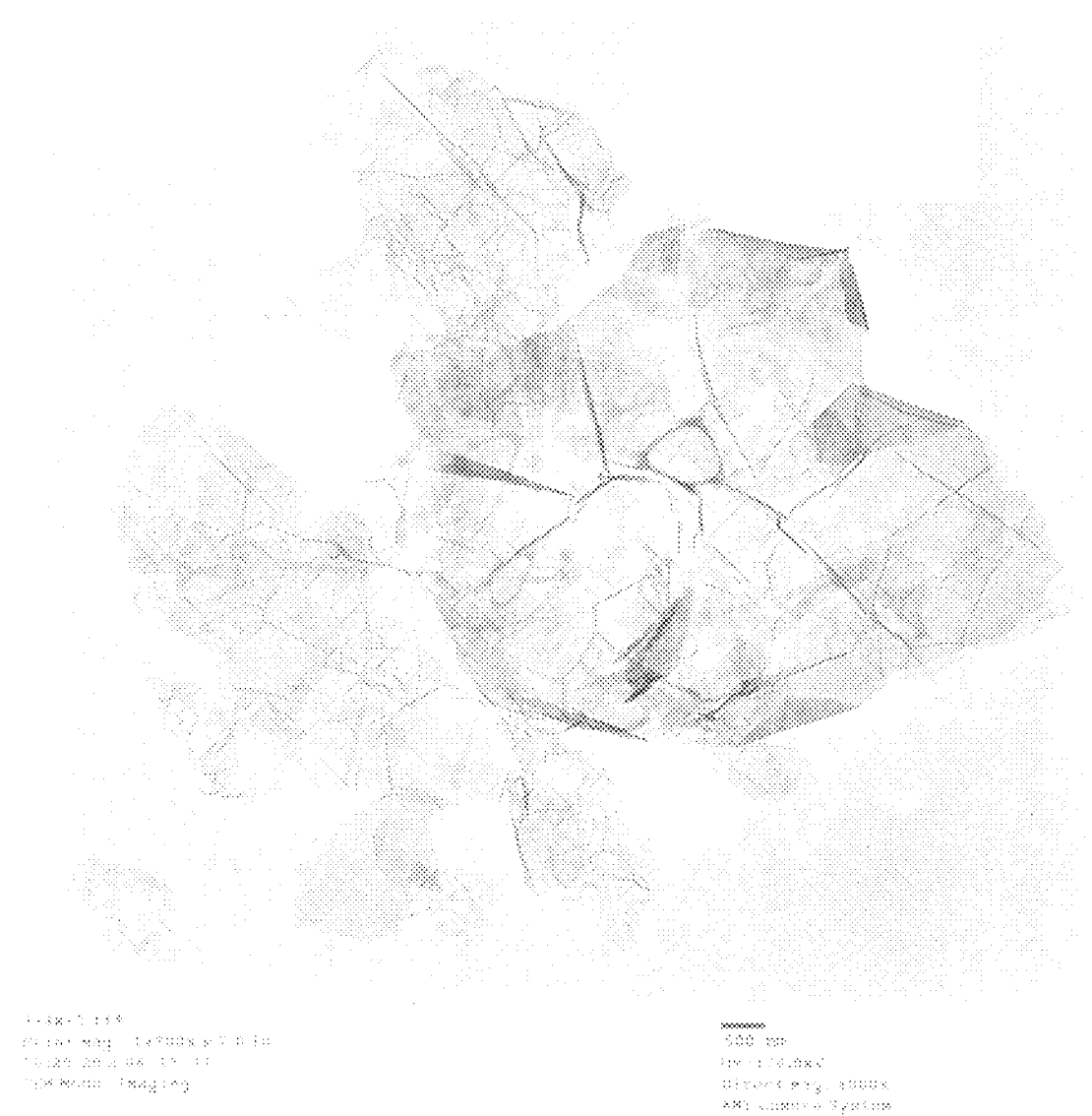
FIG. 3 TEM image of single-layer graphene sheets partially stacked together.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 1(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications. Examples of exfoliated graphite worms (or, simply, graphite worms) are presented in FIGS. 2(A) and (B).

Acids, such as sulfuric acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2 GIC will have a sequence of GG/K/GG/K/GG/K/GG . . . and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

C. Production of Integral Layer of Porous Graphene Structure

Several techniques can be employed to fabricate a conductive layer of porous graphene or expanded graphite flake structure (a web, mat, paper, or porous film, etc.), which is a monolithic body having desired interconnected pores that are accessible to liquid electrolyte in an electrochemical decomposition reactor. These electrolytes are to be intentionally decomposed under the oxidation-reduction cycling conditions discussed earlier in Section B to form the desired lithium- or sodium-containing species that bond graphene sheets or exfoliated graphite flakes together.

In one prior art process, the exfoliated graphite (or mass of graphite worms) is heavily re-compressed by using a calendaring or roll-pressing technique to obtain flexible graphite foils (106 in FIG. 1(B)), which are typically 100-500 µm thick. Even though the flexible graphite foil is porous, most of these pores are not accessible to liquid electrolyte when immersed in an external electrochemical decomposition chamber. For the preparation of a desired layer of porous graphene structure, the compressive stress and/or the gap between rollers can be readily adjusted to obtain a desired layer of porous graphene structure that has pores accessible to liquid electrolyte.

Exfoliated graphite worms may be subjected to high-intensity mechanical shearing/separation treatments using a high-intensity air jet mill, high-intensity ball mill, or ultrasonic device to produce separated nano graphene platelets (NGPs) with all the graphene platelets thinner than 100 nm, mostly thinner than 10 nm, and, in many cases, being single-layer graphene (also illustrated as 112 in FIG. 1(B)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide) may be made into a graphene film/paper (114 in FIG. 1(B)) using a film- or paper-making process.

Alternatively, with a low-intensity shearing, graphite worms tend to be separated into the so-called expanded graphite flakes (108 in FIG. 1(B) having a thickness >100 nm. These flakes can be formed into exfoliated graphite paper or mat 106 using a paper- or mat-making process, with or without a resin binder. In one preferred embodiment of the present invention, the porous web can be made by using a slurry molding or a flake/binder spraying technique. These methods can be carried out in the following ways:

As a wet process, aqueous slurry is prepared which comprises a mixture of graphene sheets or expanded graphite flakes and, optionally, about 0.1 wt. % to about 10 wt. % resin powder binder (e.g., phenolic resin). The slurry is then directed to impinge upon a sieve or screen, allowing water to permeate through, leaving behind sheets/flakes and the binder. As a dry process, the directed sheet/flake spray-up process utilizes an air-assisted flake/binder spraying gun, which conveys flakes/sheets and an optional binder to a molding tool (e.g., a perforated metal screen shaped identical or similar to the part to be molded). Air goes through perforations, but the solid components stay on the molding tool surface.

Each of these routes can be implemented as a continuous process in a roll-to-roll manner. For instance, the process begins with pulling a substrate (porous sheet) from a roller. The moving substrate receives a stream of slurry (as described in the above-described slurry molding route) from above the substrate. Water sieves through the porous substrate with all other ingredients (a mixture of graphene sheets or graphite flakes, optional fillers, and an optional binder) remaining on the surface of the substrate being moved forward to go through a compaction stage by a pair of compaction rollers. Heat may be supplied to the mixture before, during, and after compaction to help cure the thermoset binder for retaining the shape of the resulting web or mat. The web or mat, with all ingredients held in place by the thermoset binder, may be stored first (e.g., wrapped around a roller). Similar procedures may be followed for the case where the mixture is delivered to the surface of a moving substrate by compressed air, like in a directed fiber/binder spraying process. Air will permeate through the porous substrate with other solid ingredients trapped on the surface of the substrate, which are conveyed forward. The subsequent operations are similar than those involved in the slurry molding route. The resin binder, if present, is preferably burned off from the graphene sheet framework before the porous graphene structure is implemented in an electrochemical decomposition reactor.

Alternatively, rolls of porous graphene paper/mat may be readily produced in a cost-effective manner using other well-known paper-making or mat-making techniques.

The porous graphene structure (e.g. paper or mat) is then subjected to the electrochemical decomposition treatment to form the lithium- or sodium-containing species in the interstitial spaces, gaps, or voids between graphene sheets or exfoliated graphite flakes to form a dendrite-intercepting layer. In such a dendrite penetration resistant layer, the graphene sheets or platelets or exfoliated graphite flakes are bonded by the lithium- or sodium-containing species in an edge-to-edge, edge-to-face, or face-to-face manner. In a preferred embodiment, the graphene sheets or platelets or exfoliated graphite flakes have a length or width smaller than 1 µm, preferably smaller than 0.5 µm, more preferably smaller than 200 nm, and most preferably smaller than 100 nm. These desired dimensions are measured prior to these sheets/platelets/flakes being bonded by the lithium- or sodium-containing species.

For industrial-scale production of the presently invented dendrite penetration resistant layer (also referred to as a dendrite stopping or dendrite intercepting layer), the electrochemical decomposition treatment may be carried out also in a roll-to-roll manner. In an embodiment, the continuous-length graphene paper may be unwound from a feeder roller, and moved to enter an electrochemical treatment zone (equivalent to an electrochemical decomposition reactor) containing an electrolyte therein. Immersed in this electrolyte is a lithium or sodium electrode and the graphene paper is also electrically wired as the working electrode. The graphene paper is moved at a controlled speed to give enough time for electrochemical decomposition of the electrolyte to occur. The graphene paper, impregnated with and bonded by the decomposition products, is then wound up on a take-up roller. This roll-to-roll or reel-to-reel process can be easily scaled up and automated for mass production of the presently invented dendrite penetration resistant layer products.

In an alternative embodiment, the continuous-length graphene paper may be unwound from a feeder roller, deposited with some lithium or sodium metal (e.g. using physical vapor deposition or sputtering) while the graphene paper is in a dry state. The Li- or Na-deposited graphene paper is then moved to enter an electrochemical treatment zone (equivalent to an electrochemical decomposition reactor) containing an electrolyte therein. As soon as the Li-graphene layer or Na-graphene layer enters the electrolyte, essentially short-circuiting occurs between the graphene and Li (or Na). In other words, the graphene "electrode" is essentially placed in an electrochemical potential that is 0 V with respect to $Li^+/Li$ or $Na^+/Na$, subjecting the electrolyte to a reductive decomposition and enabling decomposition products to react with graphene. Optionally a lithium or sodium electrode is implemented and immersed in this electrolyte and optionally the graphene paper is electrically wired as the working electrode. Such an arrangement aids in continuing the electrochemical decomposition of electrolytes and formation of the bonding Li- or Na-containing species. The graphene paper is moved at a controlled speed to give enough time for electrochemical decomposition of the electrolyte to occur. The graphene paper, impregnated with and bonded by the decomposition products, is then wound up on a take-up roller. Again, this roll-to-roll process is highly scalable and can be fully automated for cost-effective production of the desired dendrite-stopping layer product.

The dendrite-intercepting layer of the instant invention typically exhibits a lithium ion or sodium ion conductivity from $2.5 \times 10^{-5}$ S/cm to $5.5 \times 10^{-3}$ S/cm, and more typically from $1.0 \times 10^{-4}$ S/cm to $2.5 \times 10^{-3}$ S/cm. There is no restriction on the thickness of the dendrite-intercepting layer, but for practical purposes, the dendrite penetration-resistant layer preferably has a thickness from 2 nm to 20 μm, more preferably from 10 nm to 10 μm, and most preferably from 100 nm to 1 μm.

The cathode active material in this rechargeable alkali metal battery may be selected from sulfur, selenium, tellurium, lithium sulfide, lithium selenide, lithium telluride, sodium sulfide, sodium selenide, sodium telluride, a chemically treated carbon or graphite material having an expanded inter-graphene spacing $d_{002}$ of at least 0.4 nm, or an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, nickel, or a combination thereof. Preferred cathode active materials include non-lithiated and slightly lithiated compounds having relatively high lithium or sodium storage capacities, such as $TiS_2$, $MoS_2$, $MnO_2$, $CoO_2$, and $V_2O_5$.

A novel family of 2D metal carbides or metal carbonides, now commonly referred to as MXenes, can be used as a cathode active material. MXenes can be produced by partially etching out certain elements from layered structures of metal carbides such as $Ti_3AlC_2$. For instance, an aqueous 1 M $NH_4HF_2$ was used at room temperature as the etchant for $Ti_3AlC_2$. Typically, MXene surfaces are terminated by O, OH, and/or F groups, which is why they are usually referred to as $M_{n+1}X_nT_x$, where M is an early transition metal, X is C and/or N, T represents terminating groups (0, OH, and/or F), n=1, 2, or 3, and x is the number of terminating groups. The MXene materials investigated include $Ti_2CT_x$, $(Ti_{0.5},Nb_{0.5})_2CT_x$, $Nb_2CT_x$, $V_2CT_x$, $Ti_3C_2T_x$, $(V_{0.5},Cr_{0.5})_3C_2T_x$, $Ti_3C_3T_x$, $Ta_4C_3T_x$, and $Nb_4C_3T_x$.

In an embodiment, the cathode layer contains an air cathode and the battery is a lithium-air battery or sodium-air battery. In another embodiment, the cathode active material is selected from sulfur or lithium polysulfide and the battery is a lithium-sulfur or sodium-sulfur battery. In yet another embodiment, the cathode active material may be selected from an organic or polymeric material capable of capturing or storing lithium or sodium ions (e.g. via reversibly forming a redox pair with lithium or sodium ion).

The electrolytic salts to be incorporated into an electrolyte of an alkali metal secondary battery may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-meta-sulfonate ($LiCF_3SO_3$), bis-trifluoromethyl sulfonylimide lithium [$LiN(CF_3SO_2)_2$], lithium bis(oxalato)borate (Li-BOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF3(CF_2CF_3)_3$), lithium bisperfluoroethysulfonylimide (LiBETI), an ionic liquid salt, and their sodium counterparts. Among them, $LiPF_6$, $LiBF_4$ and $LiN(CF_3SO_2)_2$ are preferred. The content of aforementioned electrolytic salts in the non-aqueous solvent is preferably 0.5 to 3.0 M (mol/L).

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li or Na metal rechargeable battery.

At the anode side, lithium metal or sodium metal may be a layer of Li or Na metal or alloy (>70% by weight of Li or Na, preferably >80%, and more preferably >90%) Alternatively, the Li or Na metal or alloy may be supported by a nano-structure composed of conductive nano-filaments. For instance, multiple conductive nano-filaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nano-filament may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

Nano fibers may be selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof. For instance, a nano-structured electrode can be obtained by electro-spinning of polyacrylonitrile (PAN) into polymer nano-fibers, followed by carbonization of PAN. It may be noted that some of the pores in the structure, as carbonized, are greater than 100 nm and some smaller than 100 nm.

In summary, a possible lithium metal cell may be comprised of an alkali metal layer (e.g. Li foil, Na foil, etc.), an anode current collector (e.g. Cu foil and/or a nano-structure of interconnected conductive filaments), a dendrite-intercepting layer, an electrolyte phase (optionally but preferably supported by a porous separator, such as a porous polyethylene-polypropylene co-polymer film), a cathode, and an optional cathode current collector (e.g. Al foil and/or a nano-structure of interconnected conductive filaments, such as graphene sheets and carbon nano-fibers).

The following examples serve to illustrate the preferred embodiments of the present invention and should not be construed as limiting the scope of the invention:

Example 1: Preparation of Graphene Oxide (GO) and Reduced Graphene Oxide (RGO) Nano Sheets from Natural Graphite Powder and their Paper/Mats (Layers of Porous Structure)

Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities. Chemical reduction of as-obtained GO to yield RGO was conducted by following the method, which involved placing 10 mL of a 0.1 wt. % GO aqueous solution in a boiling flask of 50 mL. Then, 10 µL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction.

These suspensions (GO in water and RGO in surfactant water) were then filtered through a vacuum-assisted membrane filtration apparatus to obtain porous GO and RGO paper or mat. The porous paper/mat was used as an electrode in an electrochemical decomposition reactor to form the dendrite-stopping layer. In some examples, the paper/mat was also used as a porous nano-structured anode to support sulfur or lithium polysulfide and other active materials at the cathode.

Example 2: Preparation of Discrete Functionalized GO Sheets from Graphite Fibers and Porous Films of Chemically Functionalized GO Chopped graphite fibers with an average diameter of 12 µm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. Ammonia water was added to one pot of the resulting suspension, which was ultrasonicated for another hour to produce $NH_2$-functionalized graphene oxide (f-GO). The GO sheets and functionalized GO sheets were separately diluted to a weight fraction of 5% and the suspensions were allowed to stay in the container without any mechanical disturbance for 2 days, forming liquid crystalline phase in the water-alcohol liquid when alcohol is being vaporized at 80° C.

The resulting suspensions containing GO or f-GO liquid crystals were then cast onto a glass surface using a doctor's blade to exert shear stresses, inducing GO sheet orientations. The resulting GO or f-GO coating films, after removal of liquid, have a thickness that can be varied from approximately 0.5 to 20 µm. Some of the resulting GO films were then subjected to heat treatments that involved an initial thermal reduction temperature of 80-350° C. for 2 hours, followed by heat-treating at a second temperature of 1,500-2,850° C. for different specimens to obtain various porous graphitic films. The porous film was used as an electrode in an electrochemical decomposition reactor to form the dendrite-stopping layer.

Example 3: Preparation of Single-Layer Graphene Sheets and Porous Graphene Mats from Meso-Carbon Micro-Beads (MCMBs)

Meso-carbon micro-beads (MCMBs) were supplied from China Steel Chemical Co., Kaohsiung, Taiwan. This material has a density of about 2.24 g/cm$^3$ with a median particle size of about 16 µm. In one example, MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultrasonication for 10-100 minutes to fully exfoliate and separate GO sheets. TEM and atomic force microscopic studies indicate that most of the GO sheets were single-layer graphene when the oxidation treatment exceeded 72 hours, and 2- or 3-layer graphene when the oxidation time was from 48 to 72 hours. The GO sheets contain oxygen proportion of approximately 35%-47% by weight for oxidation treatment times of 48-96 hours.

The suspension was then diluted to approximately 0.5% by weight in a container and was allowed to age therein without mechanical disturbance. The suspension was then slightly heated (to 65° C.) to vaporize the water under a vacuum-pumping condition. The formation of liquid crystalline phase became more apparent as water was removed and the GO concentration was increased. The final concentration in this sample was set at 4% by weight. The dispersion containing liquid crystals of GO sheets was then cast onto a glass surface using a doctor's blade to exert shear stresses, inducing GO sheet orientations. The resulting GO films, after removal of liquid, have a thickness that can be varied from approximately 10 to 500 µm. The resulting GO compact was then subjected to heat treatments to produce porous structures. These treatments typically involve an initial thermal reduction temperature of 80-500° C. for 1-5 hours, optionally followed by heat-treating at a second temperature of 1,500-2,850° C. These porous films were used as an electrode in an electrochemical decomposition reactor to form the dendrite-stopping layer. In some samples, these porous films were used as a nano-structured current collector to support Li or Na metal thereon.

Example 4: Preparation of Pristine Graphene Sheets/Platelets (0% Oxygen) and the Effect of Pristine Graphene Sheets Recognizing the possibility of the high defect population in GO sheets acting to reduce the conductivity of individual graphene plane, we decided to study if the use of pristine graphene sheets (non-oxidized and oxygen-free) can lead to a HOGF having a higher thermal conductivity. Pristine graphene sheets were produced by using the direct ultrasonication or liquid-phase production process.

In a typical procedure, five grams of graphite flakes, ground to approximately 20 µm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. The suspension (with or without added ion intercalation compound particles) was then filtered via vacuum-assisted filtration to obtain porous paper structures. The porous paper was used as an electrode in an electrochemical decomposition reactor to form the dendrite-stopping layer.

Example 5: Preparation of Fluorinated Graphite with Expanded Inter-Planar Spacing, Graphene Fluoride Nano Sheets and Porous Graphene Structure from these Sheets Several processes have been used by us to produce fluorinated graphite particles and, subsequently, graphene fluoride (GF) sheets, but only one process is herein described as an example. In a typical procedure, intercalated compound $C_2F \cdot xClF_3$ was further fluorinated by vapors of chlorine trifluoride to yield fluorinated graphite (FG). Specifically, pre-cooled Teflon reactor was filled with 20-30 mL of liquid pre-cooled $ClF_3$; the reactor was closed and cooled to liquid nitrogen temperature. Then, 0.5 g of lightly fluorinated graphite was put in a container with holes for $ClF_3$ gas to access and situated inside the reactor. In 7-10 days a gray-beige product with approximate formula $C_2F$ was formed. Depending upon the reaction time, the inter-planar spacing ($d_{002}$, as measured by X-ray diffraction) was varied from approximately 0.55 nm to 0.97 nm. Portion of these graphite fluoride particles was used as a zinc ion intercalation compound due to their expanded inter-planar spaces being surprisingly conducive to entry by zinc ions.

Subsequently, a desired amount of graphite fluoride (approximately 0.5 g) was mixed with 20 L of an organic solvent (methanol, ethanol, 1-propanol, 2-propanol, or 1-butanol) and subjected to an ultrasound treatment (280 W) for 30 min, leading to the formation of homogeneous yellowish dispersions. Five minutes of sonication was enough to obtain a relatively homogenous dispersion of few-layer graphene fluoride, but longer sonication times ensured the production of mostly single-layer graphene fluoride sheets. Some of these suspension samples were subjected to vacuum oven drying to recover separated graphene fluoride sheets. These graphene fluoride sheets were then added into a polymer-solvent or monomer-solvent solution to form a suspension. Various polymers or monomers (or oligomers) were utilized as the precursor film materials for subsequent carbonization and graphitization treatments.

Upon casting on a glass surface with the solvent removed, the dispersion became a brownish film formed on the glass surface. When these GF-reinforced polymer films were heat-treated, some fluorine and other non-carbon elements were released as gases that generated pores in the film. The resulting porous graphitic films had physical densities from 0.33 to 1.22 g/cm$^3$. These porous graphitic films were then roll-pressed to obtain graphitic films (porous structures) having a density from 0.8 to 1.5 g/cm$^3$ for use as an electrode in an electrochemical decomposition reactor to form the dendrite-stopping layer.

Example 6: Preparation of Nitrogenataed Graphene Nano Sheets and Porous Graphene Structures Graphene oxide (GO), synthesized in Example 1, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenataed graphene sheets remain dispersible in water. A zinc ion intercalation compounds ($MnO_2$ and $MoS_2$, respectively) was added into the nitrogenataed graphene-water suspension to form a pot of slurry. The resulting slurries were then cast and dried to produce porous graphene structures, which were used as an electrode in an electrochemical decomposition reactor to form the dendrite-stopping layer.

Example 7: Exfoliated Graphite Worms from Natural Graphite

Natural graphite, nominally sized at 45 μm, provided by Asbury Carbons (405 Old Main St., Asbury, N.J. 08802, USA) was milled to reduce the size to approximately 14 μm. The chemicals used in the present study, including fuming nitric acid (>90%), sulfuric acid (95-98%), potassium chlorate (98%), and hydrochloric acid (37%), were purchased from Sigma-Aldrich and used as received.

A reaction flask containing a magnetic stir bar was charged with sulfuric acid (360 mL) and nitric acid (180 mL) and cooled by immersion in an ice bath. The acid mixture was stirred and allowed to cool for 15 min, and graphite (20 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite sample. The dried, expandable graphite was quickly placed in a tube furnace preheated to 1,000° C. and allowed to stay inside a quartz tube for approximately 40 seconds to obtain exfoliated graphite worms. Some of the graphite worms were then roll-pressed to obtain samples of re-compressed exfoliated graphite having a range of physical densities (e.g. 0.3 to 1.2 g/cm$^3$). These porous, re-compressed structures were used as an electrode in an electrochemical decomposition reactor to form the dendrite-stopping layer.

Example 8: Exfoliated Graphite Worms from Various Synthetic Graphite Particles or Fibers Additional exfoliated graphite worms were prepared according to the same procedure described in Example 1, but the starting graphite materials were graphite fiber (Amoco P-100 graphitized carbon fiber), graphitic carbon nano-fiber (Pyrograph-III from Applied Science, Inc., Cedarville, Ohio), spheroidal graphite (HuaDong Graphite, QinDao, China), and meso-carbon micro-beads (MCMBs) (China Steel Chemical Co., Taiwan), respectively. These four types of laminar graphite materials were intercalated and exfoliated under similar conditions as used for Example 1 for different periods of time, from 24 hours to 96 hours.

Some amount of the graphite forms was then roll-pressed to obtain samples of re-compressed exfoliated graphite having a range of physical densities (e.g. 0.3 to 1.2 g/cm$^3$). A second amount of the graphite worms was subjected to low-intensity sonication to produce expanded graphite flakes. These expanded graphite flakes were then made into a paper form (the porous structure) using the vacuum-assisted filtration technique. The porous paper was used as an electrode in an electrochemical decomposition reactor to form the dendrite-stopping layer.

Example 9: Exfoliated Graphite Worms from Natural Graphite Using Hummers Method Additional graphite intercalation compound (GIC) was prepared by intercalation and oxidation of natural graphite flakes (original size of 200 mesh, from Huadong Graphite Co., Pingdu, China, milled to approximately 15 μm) with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately three hours at 30° C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The resulting GIC was exposed to a temperature of 1,050° C. for 35 seconds in a quartz tube filled with nitrogen gas to obtain worms of exfoliated graphite flakes.

Some of the graphite forms were then roll-pressed to obtain samples of re-compressed exfoliated graphite having a range of physical densities (e.g. 0.3 to 1.2 g/cm$^3$). Some of the graphite worms were subjected to low-intensity sonication to produce expanded graphite flakes. These expanded graphite flakes were then made into a porous paper form using the vacuum-assisted filtration technique. The porous paper was used as an electrode in an electrochemical decomposition reactor to form the dendrite-stopping layer.

Example 10: Electrochemical Preparation of Dendrite-Intercepting Layers Containing Graphene Sheets or Exfoliated Graphite Flakes Bonded by Lithium Chemical Species The preparation of dendrite-stopping layers was carried out in an electrochemical reactor, an apparatus very similar to an electrode plating system. In this reactor, a graphene or exfoliated graphite flake-based porous structure (in the form of a mat, paper, film, etc.) was used as a working electrode and lithium sheet as both the counter and reference electrodes. Inside the reactor is an electrolyte composed of 1M $LiPF_6$ dissolved in a mixture of ethylene carbonate (EC) and dimethyl carbonate (DMC) (1:1 by volume), as an example.

The graphene sheets or exfoliated graphite flakes in the working electrode was galvanostatically discharged (Li ions being sent to and captured by graphene surfaces/edges) and charged (Li ions released by graphene) in the voltage range from 0.01V to 4.9V at the current densities of 100-1000 mA/g following a voltage-current program similar to what would be used in a lithium-ion battery. However, the system was intentionally subjected to conditions conducive to oxidative degradation of electrolyte (close to 0.01-1.0 V vs. Li/Li$^+$) or reductive degradation of electrolyte (4.1-4.9 V vs. Li/Li$^+$) for a sufficient length of time. The degradation products react with Li$^+$ ions, Li salt, functional groups (if any) or carbon atoms on graphene edges/planes to form the lithium-containing species that also chemically bond, bridge, or cross-link the graphene sheets together.

The chemical compositions of the lithium-containing species are governed by the voltage range, the number of cycles (from 0.01 V to 4.9 V, and back), solvent type, lithium salt type, chemical composition of graphene sheets (e.g. % of O, H, and N), and electrolyte additives (e.g. LiNO$_3$), if available.

The morphology, structure and composition of graphene oxide (GO), reduced graphene oxide (RGO), the lithium-containing species that are bonded to graphene sheets were characterized by scanning electron microscope (SEM), transmission electron microscope (TEM), Raman spectrum, X-ray diffraction (XRD), and X-ray photoelectron spectroscopy (XPS). An extensive investigation that covers a broad range of lithium salts, solvents, and additives lead to the following discoveries:

A wide range of lithium-containing species were formed in a controlled manner and these species were well-bonded to the graphene sheets or expanded graphite flakes. The resulting integral layers of discrete graphene sheets or exfoliated graphite flakes bonded by these lithium chemical species are of structural integrity, robust enough to intercept metal dendrites or stop dendrite penetration through these layers. It may be noted that, quite surprisingly, the layers containing lithium chemical bonded graphene/exfoliated graphite sheets/flakes are not only good for stopping lithium dendrite in lithium metal batteries, but also effective in intercepting sodium dendrite in sodium metal batteries. These layers are electrochemically very stable in the sodium salt environment as well.

In these layers, species (CH$_2$OCO$_2$Li)$_2$ is a two-electron reduction product of ethylene carbonate (EC) in an EC-based electrolytes. ROCO$_2$Li species are present between graphene sheets in electrolytes containing propylene carbonate (PC), especially when the concentration of PC in the electrolyte is high. Li$_2$CO$_3$ is present on graphene surfaces in EC or PC based electrolytes when a higher voltage is imposed for an extended period of time. This species also appear as a reaction product of semi-carbonates with HF or water or CO$_2$. ROLi is produced on graphene surfaces in ether electrolytes such as tetrahydrofuran (THF), dimethyl carbonate (DMC), or ethyl methyl carbonate (EMC) as an electrochemical reduction product at an electrochemical potential lower than 0.5 V vs. Li/Li$^+$.

LiF is readily formed in electrolytes containing fluorinated salts such as LiAsF$_6$, LiPF$_6$, and LiBF$_4$, as a salt reduction product. Li$_2$O is a degradation product of Li$_2$CO$_3$. LiOH is formed when a small but controlled amount of water is added to the reactor. Species such as Li$_2$C$_2$O$_4$, Li carboxylate, Li methoxide, are formed in electrolytes containing 1-2 M of LiPF$_6$ in EC:EMC (e.g. at a 3:7 ratio). HCOLi is formed when methyl formate is used as a co-solvent or additive in the electrolyte.

Example 11: Electrochemical Preparation of Dendrite-Intercepting Layers Containing Graphene Sheets or Exfoliated Graphite Flakes Bonded by Sodium-Containing Chemical Species The same electrochemical reactor was used for preparation of dendrite-stopping layers featuring sodium-containing chemical species. Again, a graphene or exfoliated graphite flake-based porous structure (in the form of a mat, paper, film, etc.) was used as a working electrode and sodium sheet or rod as both the counter and reference electrodes. Inside the reactor is an electrolyte composed of a sodium salt dissolved in a solvent or mixture of solvents.

Sodium salts used in this example include sodium perchlorate (NaClO$_4$), sodium hexafluorophosphate (NaPF$_6$), sodium borofluoride (NaBF$_4$), and sodium trifluoromethanesulfonimide (NaTFSI). Solvents used include 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), methyl acetate (MA), fluoroethylene carbonate (FEC), vinylene carbonate (VC), and allyl ethyl carbonate (AEC).

The graphene sheets or exfoliated graphite flakes in the working electrode were galvanostatically discharged (Na ions being sent to and captured by graphene surfaces/edges) and charged (Na ions released by graphene) in the voltage range from 0.01V to 4.7V at the current densities of 100-1000 mA/g following a voltage-current program similar to what would be used in a lithium-ion battery. However, the system was intentionally subjected to conditions conducive to oxidative degradation of electrolyte (close to 0.01 V-0.8 V vs. Na/Na$^+$) or reductive degradation of electrolyte (3.8-4.7 V vs. Na/Na$^+$) for a sufficient length of time. The degradation products react with Na$^+$ ions, Na salt, functional groups (containing 0, H, N, etc.) or carbon atoms on graphene edges/planes to form the lithium-containing species that also chemically bond, bridge, or cross-link the graphene sheets together.

The chemical compositions of the sodium-containing species are dictated by the voltage range, the number of cycles (from 0.01 V to 4.7 V, and back), solvent type, sodium salt type, chemical composition of graphene sheets (e.g. % of 0, H, and N), and electrolyte additives (e.g. NaNO$_3$), if available. An extensive investigation that covers a broad range of lithium salts, solvents, and additives lead to the following discoveries:

A wide range of sodium-containing species were formed in a controlled manner and these species are typically well-bonded to the graphene sheets or expanded graphite flakes. The resulting integral layers of discrete graphene sheets or exfoliated graphite flakes bonded by these sodium chemical species are of structural integrity, strong enough to intercept metal dendrites or stop dendrite penetration through these layers.

In these layers, species (CH$_2$OCO$_2$Na)$_2$ is believed to be a two-electron reduction product of ethylene carbonate (EC) in an EC-based electrolytes. ROCO$_2$Na species are present between graphene sheets in electrolytes containing propylene carbonate (PC), especially when the concentration of PC in the electrolyte is high. Na$_2$CO$_3$ is present on graphene surfaces in EC or PC based electrolytes when a higher voltage is imposed for an extended period of time. This species also appear as a reaction product of semi-carbonates with HF or water or $CO_2$.

RONa is produced on graphene surfaces in ether electrolytes such as tetrahydrofuran (THF), dimethyl carbonate (DMC), or ethyl methyl carbonate (EMC) as an electrochemical reduction product at an electrochemical potential lower than 0.5 V vs. Na/Na$^+$. NaF is readily formed in electrolytes containing fluorinated salts such as $NaAsF_6$, $NaPF_6$, and $NaBF_4$, as a salt reduction product. $Na_2O$ is a degradation product of $Na_2CO_3$. NaOH is formed when a small but controlled amount of water is added to the reactor. Species such as $Na_2C_2O_4$, Na carboxylate, Na methoxide, are formed in electrolytes containing 1-2 M of $NaPF_6$ in EC:EMC (e.g. at a 3:7 ratio). HCONa is formed when methyl formate is used as a co-solvent or additive in the electrolyte.

Example 12: Preparation of MoS$_2$/RGO Hybrid Cathode Material for Li Metal and Na Metal Cells Ultra-thin MoS$_2$/RGO hybrid was synthesized by a one-step solvothermal reaction of $(NH_4)_2MoS_4$ and hydrazine in an N,N-dimethylformamide (DMF) solution of oxidized graphene oxide (GO) at 200° C. In a typical procedure, 22 mg of $(NH_4)_2MoS_4$ was added to 10 mg of GO dispersed in 10 ml of DMF. The mixture was sonicated at room temperature for approximately 10 min until a clear and homogeneous solution was obtained. After that, 0.1 nil of $N_2H_4 \cdot H_2O$ was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for at least 5 times to ensure that most DMF was removed. Finally, product was dried and made into a cathode.

Example 13: Preparation of Two-Dimensional (2D) Layered Bi$_2$Se$_3$ Chalcogenide Nanoribbons for Both Li Metal and Na Metal Cells The preparation of (2D layered Bi$_2$Se$_3$ chalcogenide nanoribbons is well-known in the art. For instance, Bi$_2$Se$_3$ nanoribbons were grown using the vapor-liquid-solid (VLS) method. Nanoribbons herein produced are, on average, 30-55 nm thick with widths and lengths ranging from hundreds of nanometers to several micrometers. Larger nanoribbons were subjected to ball-milling for reducing the lateral dimensions (length and width) to below 200 nm. Nanoribbons prepared by these procedures (with or without the presence of graphene sheets or exfoliated graphite flakes) were found to have sharp edges and high crystallinity, which enable maximum intercalation by Li or Na ions.

Example 14: MXenes as Examples of a Cathode Active Material for Both Li Metal and Na Metal Cells Selected MXenes, were produced by partially etching out certain elements from layered structures of metal carbides such as Ti$_3$AlC$_2$. For instance, an aqueous 1 M NH$_4$HF$_2$ was used at room temperature as the etchant for Ti$_3$AlC$_2$. Typically, MXene surfaces are terminated by 0, OH, and/or F groups, which is why they are usually referred to as $M_{n+1}X_nT_x$, where M is an early transition metal, X is C and/or N, T represents terminating groups (O, OH, and/or F), n=1, 2, or 3, and x is the number of terminating groups. The MXene materials investigated include Ti$_2$CT$_x$, Nb$_2$CT$_x$, V$_2$CT$_x$, Ti$_3$CNT$_x$, and Ta$_4$C$_3$T$_x$. Typically, 85% MXene, 8% graphene, and 7% PVDF binder were mixed and made into a cathode layer on an Al foil current collector.

Example 15: Preparation of Various MnO$_2$-Graphene Cathodes for Both Li Metal and Na Metal Cells The MnO$_2$ powder was synthesized by two methods (each with or without the presence of graphene sheets). In one method, a 0.1 mol/L KMnO$_4$ aqueous solution was prepared by dissolving potassium permanganate in deionized water. Meanwhile 13.32 g surfactant of high purity sodium bis(2-ethylhexyl) sulfosuccinate was added in 300 mL iso-octane (oil) and stirred well to get an optically transparent solution. Then, 32.4 mL of 0.1 mol/L KMnO$_4$ solution was added in the solution, which was ultrasonicated for 30 min to prepare a dark brown precipitate. The product was separated, washed several times with distilled water and ethanol, and dried at 80° C. for 12 h. The sample is MnO$_2$. The batteries are each composed of a graphene/MnO$_2$-based cathode, a Li or Na metal-based anode.

Example 16: Preparation of Graphene-Enabled Li$_x$V$_3$O$_8$ Nano-Sheets from V$_2$O$_5$ and LiOH as a Cathode for Li Metal Cell All chemicals used in this study were analytical grade and were used as received without further purification. V$_2$O$_5$ (99.6%, Alfa Aesar) and LiOH (99+%, Sigma-Aldrich) were used to prepare the precursor solution. Graphene oxide (GO, 1% w/v obtained in Example 2 above) was used as a structure modifier. First, V$_2$O$_5$ and LiOH in a stoichiometric V/Li ratio of 1:3 were dissolved in actively stirred de-ionized water at 50° C. until an aqueous solution of Li$_x$V$_3$O$_8$ was formed. Then, GO suspension was added while stirring, and the resulting suspension was atomized and dried in an oven at 160° C. to produce the spherical composite particulates of GO/Li$_x$V$_3$O$_8$ nano-sheets and the sample was designated NLVO-1. Corresponding Li$_x$V$_3$O$_8$ materials were obtained under comparable processing conditions, but without graphene oxide sheets. The sample was designated as LVO-2.

The Nyquist plots obtained from electrical impedance tests show a semicircle in the high to medium frequency range, which describes the charge-transfer resistance for both electrodes. The intercept value is considered to represent the total electrical resistance offered by the electrolyte. The inclined line represents the Warburg impedance at low frequency, which indicates the diffusion of ions in the solid matrix. The values of Rct for the vanadium oxide alone and graphene-enhanced composite electrodes are about 50.0 and 350.0Ω for NLVO-1 and LVO-2, respectively. The Rct of the composite electrode is much smaller than that of the LVO electrode. Therefore, the presence of graphene (<2% by weight in this case) in the vanadium oxide composite has dramatically reduced the internal charge transfer resistance and improved the battery performance upon extended cycling.

An additional set of graphene-enabled Li$_x$V$_3$O$_8$ nano-sheet composite particulates was produced from V$_2$O$_5$ and LiOH under comparable conditions, but was dried under different atomization temperatures, pressures, and gas flow rates to achieve four samples of composite particulates with four different Li$_x$V$_3$O$_8$ nano-sheet average thicknesses (4.6 nm, 8.5 nm, 14 nm, and 35 nm). A sample of $Li_xV_3O_8$ sheets/rods with an average thickness/diameter of 76 nm was also obtained without the presence of graphene oxide sheets (but, with the presence of carbon black particles) under the same processing conditions for the graphene-enhanced particulates with a nano-sheet average thickness of 35 nm. It seems that carbon black is not as good a nucleating agent as graphene for the formation of $Li_xV_3O_8$ nano-sheet crystals. The specific capacity of these cathode materials was investigated using Li foil as a counter electrode.

Example 17: Hydrothermal Synthesis of Graphene-Enabled $Na_xV_2O_5$ Nano-Belts from $V_2O_5$, NaCl, and Graphene Oxide for Na Metal Cells In a typical experiment, vanadium pentoxide gels were obtained by mixing $V_2O_5$ in a NaCl aqueous solution. The $Na^+$-exchanged gels obtained by interaction with NaCl solution (the Na:V molar ratio was kept as 1:1), with or without mixing by a GO suspension, were placed in a Teflon-lined stainless steel 35 ml autoclave, sealed, and heated up to 180° C. for 8-24 h. After such a hydrothermal treatment, the green solids were collected, thoroughly washed, optionally ultrasonicated, and dried at 70° C. for 12 h followed by either (a) drying at 200° C. under vacuum overnight to obtain paper-like lamella composite structures or (b) mixing with another 0.1% GO in water, ultrasonicating to break down nano-belt sizes, and then spray-drying at 200° C. to obtain graphene-embraced composite particulates.

Example 18: Electrochemical Deposition of S on Various Webs or Paper for Li—S and Room Temperature Na—S Batteries The electrochemical deposition of sulfur (S) was conducted before the cathode active layer was incorporated into an alkali metal-sulfur battery cell (Li—S and Na—S). The anode, the electrolyte, and the integral layer of porous graphene structure (serving as a cathode layer) are positioned in an external container outside of a lithium-sulfur cell. The needed apparatus is similar to an electro-plating system, which is well-known in the art.

In a typical procedure, a metal polysulfide ($Li_2S_9$ and $Nai_2S_6$) is dissolved in a solvent (e.g. mixture of DOL/DME at a volume ratio from 1:3 to 3:1) to form an electrolyte solution. The electrolyte solution is then poured into a chamber or reactor under a dry and controlled atmosphere condition (e.g. He or Nitrogen gas). A metal foil was used as the anode and a layer of the porous graphene structure as the cathode; both being immersed in the electrolyte solution. This configuration constitutes an electrochemical deposition system. The step of electrochemically depositing nano-scaled sulfur particles or coating on the graphene surfaces was conducted at a current density preferably in the range of 1 mA/g to 10 A/g, based on the layer weight of the porous graphene structure.

The chemical reactions that occurred in this reactor may be represented by the following equation: $M_xS_y \rightarrow M_xS_{y-z} + zS$ (typically z=1-4). Quite surprisingly, the precipitated S is preferentially nucleated and grown on massive graphene surfaces to form nano-scaled coating or nano particles. The coating thickness or particle diameter and the amount of S coating/particles was controlled by the specific surface area, electro-chemical reaction current density, temperature and time. In general, a lower current density and lower reaction temperature lead to a more uniform distribution of S and the reactions are easier to control. A longer reaction time leads to a larger amount of S deposited on graphene surfaces and the reaction is ceased when the sulfur source is consumed or when a desired amount of S is deposited.

The specific discharge capacities of two Li—S cells, one containing the presently invented dendrite-intercepting layer and the other not containing such a layer, were plotted as a function of the number of cycles. Quite unexpectedly, the cell containing a dendrite-intercepting layer actually shows a more stable cycling behavior even though both cells have otherwise identical configurations. It appears that the invented dendrite-intercepting layer not only serves to stop dendrite penetration but also block the lithium polysulfide species that were dissolved in the liquid electrolyte and migrated from the cathode toward the anode side. Such a blocking action prevents the lithium polysulfide from reaching and reacting with the Li metal at the anode, which otherwise would form $Li_2S$ that irreversibly deposits on Li metal surface. This so-called shuttling effect in all Li—S cells is actually significantly reduced due to the presence of this dendrite-intercepting layer. This is an un-intended, but highly beneficial result.

Example 19: Li—S and Room Temperature Na—S Cells Containing Chemical Reaction Deposited Sulfur Particles A chemical deposition method is herein utilized to prepare S-graphene composites from isolated graphene oxide sheets (i.e. these GO sheets were not packed into an integral structure of porous graphene prior to chemical deposition of S on surfaces of GO sheets). The procedure began with adding 0.58 g $Na_2S$ into a flask that had been filled with 25 ml distilled water to form a $Na_2S$ solution. Then, 0.72 g elemental S was suspended in the $Na_2S$ solution and stirred with a magnetic stirrer for about 2 hours at room temperature. The color of the solution changed slowly to orange-yellow as the sulfur dissolved. After dissolution of the sulfur, a sodium polysulfide ($Na_2S_x$) solution was obtained (x=4-10).

Subsequently, a graphene oxide-sulfur (GO-S) composite was prepared by a chemical deposition method in an aqueous solution. First, 180 mg of graphite oxide was suspended in 180 ml ultrapure water and then sonicated at 50° C. for 5 hours to form a stable graphene oxide (GO) dispersion. Subsequently, the $Na_2S_x$ solution was added to the above-prepared GO dispersions in the presence of 5 wt. % surfactant cetyl trimethyl-ammonium bromide (CTAB), the as-prepared GO/$Na_2S_x$ blended solution was sonicated for another 2 hours and then titrated into 100 ml of 2 mol/L HCOOH solution at a rate of 30-40 drops/min and stirred for 2 hours. Finally, the precipitate was filtered and washed with acetone and distilled water several times to eliminate salts and impurities. After filtration, the precipitate was dried at 50° C. in a drying oven for 48 hours. The reaction may be represented by the following reaction: $S_x^{2-} + 2H^+ \rightarrow (x-1)S + H_2S$. The GO-S composite was used as a cathode active material in a Li—S cell and room temperature Na—S cell.

Example 20: Li-Air and Na-Air Cells with Ionic Liquid Electrolytes

To test the performance of the Li-air and Na-air batteries employing a dendrite-intercepting layer and those without such a layer, several pouch cells with dimension of 5 cm×5 cm were built. Porous carbon electrodes were prepared by first preparing ink slurries by dissolving a 90 wt. %

EC600JD Ketjen black (AkzoNobel) and 5 wt. % Kynar PVDF (Arkema Corporation) in N-methyl-2-pyrrolidone (NMP). Air electrodes were prepared with a carbon loading of approximately 20.0 mg/cm$^2$ by hand-painting the inks onto a carbon cloth (PANEX 35, Zoltek Corporation), which was then dried at 180° C. overnight. The total geometric area of the electrodes was 3.93 cm$^2$. The Li/O$_2$ and Na/O$_2$ test pouch cells were assembled in an argon-filled glove box. Each cell consists of metallic lithium or sodium anode and the air electrode as a cathode, prepared as mentioned above. A copper current collector for the anode and an aluminum current collector for the cathode were used. A Celgard 3401 separator separating the two electrodes was soaked in 1 M LiTFSI-DOL/EMITFSI (6/4) solutions for a minimum of 24 hours. The cathode was soaked in the oxygen saturated EMITFSI-DOL/LiTFSI solution for 24 hours and was placed under vacuum for an hour before being included in the cell assembly.

The cells were placed in an oxygen-filled glove box where oxygen pressure was maintained at 1 atm. Cell charge-discharge was carried out with a battery cycler at the current rate of 0.1 mA/cm$^2$ at room temperature. It was found surprisingly that a Li-air or Na-air featuring a dendrite-intercepting layer exhibits a higher round-trip efficiency for cells (75% and 68%) as compared with their counterparts without such a dendrite-stopping layer (64% and 55%, respectively, for the Li-air and Na-air cell). Most significantly, the cells without such a dendrite-stopping layer tended to fail in 25-35 charge-discharge cycles. In contrast, the presently invented cells containing such a dendrite-stopping layer usually lasted for more than 100 cycles without experiencing any dendrite-induced failure.

Examples 21: Evaluation of Electrochemical Performance of Various Li and Na Secondary Metal Batteries A broad array of Li metal and Na metal secondary (rechargeable) batteries were investigated. None of the batteries containing a dendrite-intercepting layer prepared according to instant invention were found to fail due to dendrite penetration through the separator layer. In fact, no dendrite was found to penetrate the invented dendrite-intercepting layer based on the observation of post-testing inspection on a large number of battery cells.

Li or Na ion storage capacities of many cells were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM). The presently invented dendrite-intercepting layer enables the safe operation of many lithium metal and sodium metal secondary batteries capable of storing an energy density of 300-400 Wh/kg (e.g. lithium metal-metal oxide cells and Na—S cells), 400-700 Wh/kg (e.g. Li—S cells), and >1,000 Wh/kg (e.g. Li-air cells) for a long cycle life without a dendrite penetration problem.

In summary, the present invention provides an innovative, versatile, and surprisingly effective platform materials technology that enables the design and manufacture of superior and safe alkali metal and sodium metal rechargeable batteries. The lithium dendrite or sodium dendrite issue in these high-energy and high-power cells is essentially eliminated, making it possible for these batteries to be widely implemented for electric vehicle, renewable energy storage, and electronic device applications.

The invention claimed is:

1. A rechargeable alkali metal battery comprising:
   (A) an anode comprising an alkali metal layer, an optional anode current collector layer, and a dendrite penetration-resistant layer composed of multiple graphene sheets or platelets or exfoliated graphite flakes that are chemically bonded by a lithium- or sodium-containing species to form an integral layer that prevents dendrite penetration through said integral layer, wherein said lithium- or sodium-containing species is selected from Li$_2$CO$_3$, Li$_2$O, Li$_2$C$_2$O$_4$, LiOH, LiX, ROCO$_2$Li, HCOLi, ROLi, (ROCO$_2$Li)$_2$, (CH$_2$OCO$_2$Li)$_2$, Li$_2$S, Li$_x$SO$_y$, Na$_2$CO$_3$, Na$_2$O, Na$_2$C$_2$O$_4$, NaOH, NaX, ROCO$_2$Na, HCONa, RONa, (ROCO$_2$Na)$_2$, (CH$_2$OCO$_2$Na)$_2$, Na$_2$S, Na$_x$SO$_y$, or a combination thereof, wherein X=F, Cl, I, or Br, R=a hydrocarbon group, and $0<x\leq1$, $1\leq y\leq4$;
   (B) a cathode comprising a cathode layer having a cathode active material for reversibly storing alkali metal ions and an optional cathode current collector layer to support said cathode active material; and
   (C) a separator and electrolyte component in contact with said anode and said cathode;
   wherein said dendrite penetration-resistant layer is disposed between said alkali metal layer and said separator.

2. The rechargeable alkali metal battery of claim 1, wherein said graphene sheets or platelets include single-layer sheets or multi-layer platelets of a graphene material selected from pristine graphene, graphene oxide having 2% to 46% by weight of oxygen, reduced graphene oxide having 0.01% to 2% by weight of oxygen, chemically functionalized graphene, nitrogen-doped graphene, boron-doped graphene, fluorinated graphene, or a combination thereof.

3. The rechargeable alkali metal battery of claim 1, wherein said graphene sheets or platelets or exfoliated graphite flakes are bonded by said lithium- or sodium-containing species in an edge-to-edge, edge-to-face, or face-to-face manner.

4. The rechargeable alkali metal battery of claim 1, wherein said graphene sheets or platelets or exfoliated graphite flakes have a length or width smaller than 0.5 μm measured prior to being bonded by said lithium- or sodium-containing species.

5. The rechargeable alkali metal battery of claim 1, wherein said graphene sheets or platelets or exfoliated graphite flakes have a length or width smaller than 100 nm measured prior to being bonded by said lithium- or sodium-containing species.

6. The rechargeable alkali metal battery of claim 1, wherein said dendrite penetration-resistant layer has a thickness from 2 nm to 20 μm.

7. The rechargeable alkali metal battery of claim 1, wherein said dendrite penetration-resistant layer has a thickness from 10 nm to 10 μm.

8. The rechargeable alkali metal battery of claim 1, wherein said cathode active material is selected from sulfur, selenium, tellurium, lithium sulfide, lithium selenide, lithium telluride, sodium sulfide, sodium selenide, sodium telluride, a chemically treated carbon or graphite material having an expanded inter-graphene spacing $d_{002}$ of at least 0.4 nm, or an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, nickel, or a combination thereof.

9. The rechargeable alkali metal battery of claim 1, wherein said cathode layer contains an air cathode and said battery is a lithium-air battery or sodium-air battery.

10. The rechargeable alkali metal battery of claim 1, wherein said cathode active material is selected from sulfur or lithium polysulfide and said battery is a lithium-sulfur or room temperature sodium-sulfur battery.

11. The rechargeable alkali metal battery of claim 1, wherein said electrolyte comprises a metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoroethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, sodium perchlorate ($NaClO_4$), sodium hexafluorophosphate ($NaPF_6$), sodium borofluoride ($NaBF_4$), sodium hexafluoroarsenide, sodium trifluoro-metasulfonate ($NaCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide sodium ($NaN(CF_3SO_2)_2$), or a combination thereof.

12. The rechargeable alkali metal battery of claim 1, wherein said electrolyte contains a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (ME), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

13. The rechargeable alkali metal battery of claim 1 wherein said electrolyte is selected from polymer electrolyte, polymer gel electrolyte, composite electrolyte, ionic liquid electrolyte, aqueous electrolyte, non-aqueous liquid electrolyte, soft matter phase electrolyte, solid-state electrolyte, or a combination thereof.

14. The rechargeable alkali metal battery of claim 1, wherein said dendrite penetration-resistant layer is a lithium ion conductor or sodium ion conductor having an ion conductivity no less than $10^{-4}$ S/cm.

15. The rechargeable alkali metal battery of claim 1, wherein said dendrite penetration-resistant layer is a lithium ion conductor or sodium ion conductor having an ion conductivity no less than $10^{-3}$ S/cm.

16. The rechargeable alkali metal battery of claim 1, wherein said graphene sheets contain point defects to promote migration of lithium or sodium ions, wherein said point defects are produced by removing non-carbon elements or chemical functional groups from graphene surfaces.

17. The rechargeable alkali metal battery of claim 1 wherein said alkali metal layer contains an anode active material selected from lithium metal, sodium metal, a lithium metal alloy, sodium metal alloy, a lithium intercalation compound, a sodium intercalation compound, a lithiated compound, a sodiated compound, or a combination thereof.

18. The rechargeable alkali metal battery of claim 1 wherein said graphene sheets or platelets contain single-layer or few-layer graphene, wherein few-layer is defined as 10 planes of hexagonal carbon atoms or less.

19. The rechargeable alkali metal battery of claim 1 wherein said lithium- or sodium-containing species contain at least two species selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, x=0-1, y=1-4.

20. The rechargeable alkali metal battery of claim 1, wherein said alkali metal layer contains an anode active material supported by a nano-structure of conductive nanofilaments that are interconnected to form a network of electron-conducting paths having substantially interconnected pores to accommodate electrolyte, wherein the nanofilaments are selected from a carbon nanofiber, graphite nanofiber, carbon nanotube, metal nano wire, conductive nanofibers obtained by electro-spinning, conductive electrospun composite nanofibers, graphene sheets or platelet, exfoliated graphite flakes, or a combination thereof.

\* \* \* \* \*